April 10, 1951         H. HURVITZ         2,548,373
MAGNETIC GEARING SYSTEM
Filed Nov. 15, 1948
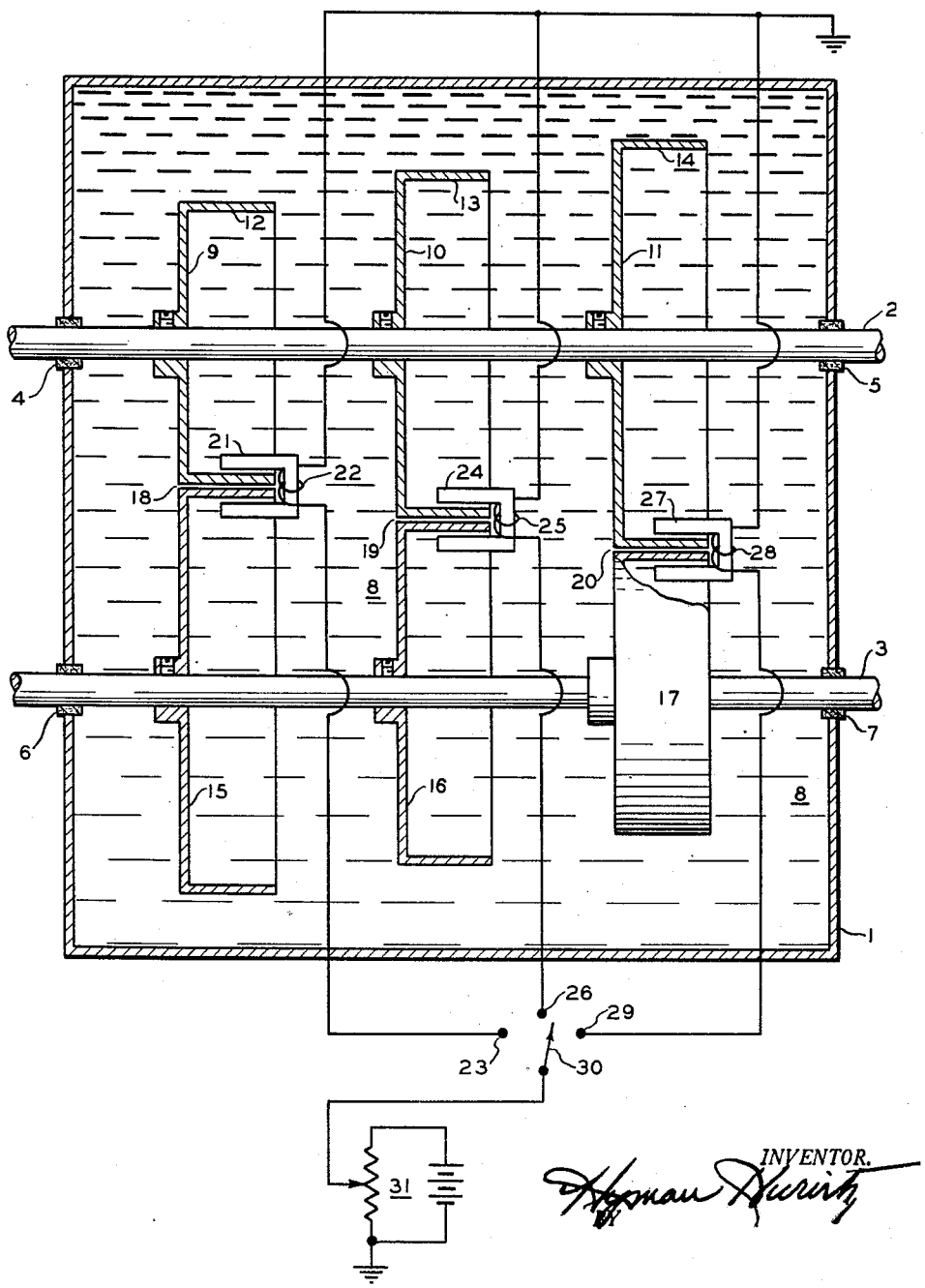
INVENTOR.
Hyman Hurvitz

Patented Apr. 10, 1951

2,548,373

UNITED STATES PATENT OFFICE 2,548,373

MAGNETIC GEARING SYSTEM

Hyman Hurvitz, Washington, D. C., assignor to Melpar, Inc., Alexandria, Va.

Application November 15, 1948, Serial No. 60,036

4 Claims. (Cl. 74—325)

This invention relates generally to magnetic gearing systems and more particularly to magnetic change gearing systems utilizing liquid magnetic material as a coupling medium between pairs of gears.

While magnetic gears are known to the prior art, they have heretofore not been practical devices, of wide utility, and have been built to have definite gear ratios, dependent upon the total number of magnetic poles established on a pair of inter-meshing magnetic gears, and have been useful solely for the purpose of transferring extremely small torques.

It is an object of the present invention to provide a novel magnetic gearing system which shall be capable for transferring extremely large quantities of power, of the same order of magnitude as may be transferred by conventional mechanical gearing systems using gear teeth.

It is a further object of the invention to provide a gear change system wherein a plurality of gears of different sizes may be secured in complementary pairs to a pair of shafts, and wherein a coupling between the shafts may be accomplished selectively via any of the plurality of pairs of gears, the gears being selected by the simple operation of electrically selecting a magnetizing circuit.

It is a further object of the present invention to provide a novel gearing system which does not utilize gear teeth, or any definite gearing ratio between pairs of gears, each pair of gears having the property of enabling slippage between the gears comprising the pair, and this slippage being readily controllable by electrical means.

The above and still further objects and features of advantages of the present invention will become apparent upon consideration of the following detailed description of an embodiment thereof, especially when taken in conjunction with the single figure of the drawings, which illustrates in cross section the mechanical features of an embodiment of the invention, combined with a schematic circuit diagram of electrical features thereof.

Referring now more specifically to the drawings, the reference numeral 1 denotes a metallic casing, which may be fabricated of non-magnetic material. A pair of shafts, 2 and 3, extend through the casing via rotary seals 4 and 5 associated with the shafts 2, and rotary seals 6 and 7 associated with the shaft 3. Located within the casing 1 is a quantity of light oil impregnated with carbonyl iron particles to constitute a liquid magnetic material 8. Secured to the shaft 2 is a plurality of cylindrical structures 9, 10, 11, of progressively increasing diameter, gears 9, 10 and 11 being formed without teeth or other projections, and comprising smooth cylindrical members having flanges or peripheries denoted, respectively, by the reference numerals 12, 13 and 14. A similar plurality of gears, of similar construction, identified by the reference numerals 15, 16 and 17 are secured to the shaft 3, the gears 15, 16 and 17 being of progressively smaller diameter so that the gears 12 and 15 form a complementary pair, the gears 13 and 16 form a complementary pair and the gears 11 and 17 form a complementary pair, the gears of each pair of gears having appropriate diameters, so that during rotation the peripheries or flange portions thereof will remain only slightly out of contact and with a relatively fixed gap therebetween, to provide points of approximate tangency.

An electro-magnet 21 is secured within the liquid magnetic material 8, the magnet 21 having generally a C shaped core embracing the flanges of the gears 9 and 15 at the point of approximate tangency thereof, and being energized by means of a coil 22, one terminal of which is grounded and the remaining terminal of which is brought out to a switch contact 23. A similar magnet and magnetizing coil 24, 25 are provided for the gear pairs 10 and 16, the magnetizing coil 25 being brought out to a switch contact 26. Still another similar magnet 27 and magnetizing coil 28 are provided for the gears 11 and 17, the magnetizing coil 28 being brought out to a switch contact 29.

The magnets 21, 24 and 27 are normally de-energized, so that no coupling exists between the pairs of gears 9—15, 10—16 and 11—17, respectively, the shafts 2 and 3 being then free to move relative to one another. Upon selectively energizing any of the coils 22, 25, 28, however, a strong magnetic field is set up in the liquid magnetic material 8, but only between the points of approximate tangency of the pair of gears involved, establishing a mechanical coupling therebetween at such points only. Thereafter upon rotating either the shaft 2 or the shaft 3, the remaining one of the shafts will be rotated at a speed determined by the relative diameters of the gears of the pair of gears involved.

Selection of the pairs of gears may be accomplished by throwing the selective switch arm 30 to a selected one of the contacts 23, 26, 29. After selection has been accomplished, the total extent of gear coupling may be determined by adjusting the setting of the potentiometer 31. When the selected one of magnets 21, 24, 27 is fully magnetized practically no slippage will occur between associated gears of each pair. However, by weakening the magnetic flux produced by the selected one of magnets 21, 24, 27, as by reducing the magnetizing current flowing in the coils 22, 25, 58, respectively, in response to adjustment of the setting of the potentiometer 31, the magnetic field existing between the approximate points of tangency of the gear pairs 9—15, 10—16, 11—17, may be reduced, introducing slippage between the gears of each pair in the presence of load on the driven one of the shafts 2, 3.

It will be seen then, that my novel gearing system is far more flexible than the normal mechanical gearing system, in that for each gear ratio, established selectively by electrically selecting a gear pair, adjustment of the gearing ratio may be accomplished, and further in that the pairs of gears may be selected by the simple operation of selectively positioning an electrical switch arm, which selects a coupling electromagnet for the desired pair of gears. Gear pairs may be constructed in accordance with the invention with far greater economy than is presently possible in constructing mechanical gears since no necessity exists for machining gear teeth, and since but relatively slight accuracy of machining operations is required in fabricating the gears.

While I have described and illustrated one specific embodiment of my invention, it will be clear that variations of the general arrangement and of the details of construction which are specifically illustrated and described may be resorted to without departing from the true spirit and scope of the invention.

What I claim and desire to secure by Letters Patent of the United States is:

1. A gearing system comprising, a first cylinder having a periphery fabricated of magnetic material, a second cylinder having a periphery fabricated of magnetic material, means commonly securing said cylinders to a first single shaft for rotation therewith, a third cylinder having a periphery fabricated of magnetic material, a fourth cylinder having a periphery fabricated of magnetic material, means securing said third and fourth cylinders to a second single shaft for rotation therewith, said first and third cylinders and said second and fourth cylinders having continuously adjacent peripheral portions during rotation of said shafts, magnetic fluid material interposed between each of said adjacent peripherial portions, and stationary means for selectively establishing magnetic fields between said adjacent peripheral portions and in said magnetic fluid material.

2. A gearing system comprising, a first cylinder having a periphery fabricated of magnetic material, a second cylinder having a periphery fabricated of magnetic material, means commonly securing said cylinders to a first single shaft for rotation therewith, a third cylinder having a periphery fabricated of magnetic material, a fourth cylinder having a periphery fabricated of magnetic material, means securing said third and fourth cylinders to a second single shaft for rotation therewith, said first and third cylinders and said second and fourth cylinders having continuously adjacent peripheral portions during rotation of said shafts, magnetic fluid material interposed between each of said adjacent peripheral portions, and stationary means for selectively establishing magnetic fields only between said adjacent peripheral portions and in said magnetic fluid material.

3. A gearing system comprising, a first cylinder having a periphery fabricated of magnetic material, a second cylinder having a periphery fabricated of magnetic material, means commonly securing said cylinders to a first single shaft for rotation therewith, a third cylinder having a periphery fabricated of magnetic material, a fourth cylinder having a periphery fabricated of magnetic material, means securing said third and fourth cylinders to a second single shaft for rotation therewith, said first and third cylinders and said second and fourth cylinders having continuously adjacent peripheral portions during rotation of said shafts, magnetic fluid material interposed between each of said adjacent peripheral portions, and stationary means for selectively establishing magnetic fields between said adjacent peripheral portions and in said magnetic fluid material, and means for adjusting the magnitude of said magnetic fields.

4. A gearing system comprising, a first cylinder having a periphery fabricated of magnetic material, a second cylinder having a periphery fabricated of magnetic material, means commonly securing said cylinders to a first single shaft for rotation therewith, a third cylinder having a periphery fabricated of magnetic material, a fourth cylinder having a periphery fabricated of magnetic material, means securing said third and fourth cylinders to a second single shaft for rotation therewith, said shafts being arranged physically in parallel, said first and third cylinders and said second and fourth cylinders having continuously adjacent peripheral portions during rotation of said shafts, magnetic fluid material interposed between each of said adjacent peripheral portions, and means comprising a plurality of stationary electro-magnets and a selective switch for selectively energizing said electro-magnets for establishing magnetic fields selectively between said adjacent peripheral portions and in said magnetic fluid material.

HYMAN HURVITZ.

REFERENCES CITED

The following references are of record in the file of this patent:

UNITED STATES PATENTS

| Number | Name | Date |
|---|---|---|
| 299,231 | Laird | May 27, 1884 |
| 856,846 | Cole | June 11, 1907 |
| 982,789 | Bowie, Jr. | Jan. 31, 1911 |
| 1,012,119 | Barclay | Dec. 12, 1911 |
| 1,292,218 | Von Zweigbergk | Jan. 21, 1919 |
| 1,548,016 | Riboisiere | July 28, 1925 |
| 1,840,726 | Lange | Jan. 12, 1932 |
| 2,045,098 | Payne | June 23, 1936 |
| 2,258,194 | Queneau | Oct. 7, 1941 |

FOREIGN PATENTS

| Number | Country | Date |
|---|---|---|
| 565,103 | Germany | Nov. 11, 1932 |

OTHER REFERENCES

Publication, National Bureau of Standards Technical Report 1213; published April 2, 1948.